United States Patent
Dick et al.

[11] Patent Number: 5,947,386
[45] Date of Patent: Sep. 7, 1999

[54] IN-GROUND SPRINKLER WITH INTEGRAL YET SEPARATED AND LOCATABLE SURFACE HOSE QUICK-CONNECTION

[76] Inventors: William M. Dick, 927 Hedgestone Dr., San Antonio, Tex. 78258; Dean C. Rodgers, 112 Ivy Arch, Yorktown, Va. 23693

[21] Appl. No.: 08/955,538

[22] Filed: Oct. 22, 1997

Related U.S. Application Data

[60] Provisional application No. 60/029,100, Oct. 23, 1996.

[51] Int. Cl.[6] ................................................. B05B 15/06
[52] U.S. Cl. ........................................ 239/201; 239/587.2
[58] Field of Search ................................... 239/200, 201, 239/203, 273, 276, 279, 587.1, 587.2, 587.5, 588; 248/75, 80, 81

[56] References Cited

U.S. PATENT DOCUMENTS

| | | | |
|---|---|---|---|
| 4,856,823 | 8/1989 | Heren | 285/81 |
| 4,892,252 | 1/1990 | Bruninga | 239/205 |
| 5,040,729 | 8/1991 | Carozza | 239/201 |
| 5,221,114 | 6/1993 | Parker | 285/255 |
| 5,242,112 | 9/1993 | Dunn et al. | 239/203 |
| 5,292,071 | 3/1994 | Kruer | 239/242 |
| 5,368,229 | 11/1994 | Hayes et al. | 239/276 X |

OTHER PUBLICATIONS

Hunter, Swing Joint, Nov. 16, 1998 http://www.huntering.com/Products/Misc/sj.htm.
King Brothers Industries, Triple Swing Assembly, Nov. 16, 1998 http://www.kbico.com/products/riserpro.htm.

*Primary Examiner*—Lesley D. Morris
*Attorney, Agent, or Firm*—Peter J. Van Bergen

[57] ABSTRACT

A sprinkler is provided which includes an in-ground sprinkler head connected to a surface connector. The surface connector includes a semi-flexible tube connected to curved pipe fittings and ending on the top with a quick-connect device attached to a swiveling mechanism to allow easy connection and disconnection from a garden hose of any in-ground sprinkler head. The bottom end of the connector has a male pipe fitting that connects to any type of in-ground sprinkler head. The top of the connector is a male quick-connect device attached to allow full swiveling motion to permit the quick connect device to be stored in a position at or below ground level or to be raised above ground level to connect to a hose. Flexible tubing of various lengths permits the swiveling quick-connect mechanism to be located near the sprinkler head or at other places convenient for connection to the garden hose or the accommodation of various sizes of sprinkler heads or both and provides a way to absorb the force of connecting and disconnecting a hose without disturbing the position of the sprinkler.

16 Claims, 3 Drawing Sheets

5,947,386

IN-GROUND SPRINKLER WITH INTEGRAL YET SEPARATED AND LOCATABLE SURFACE HOSE QUICK-CONNECTION

This application claims the benefit of U.S. Provisional Application No. 60/029,100 filed Oct. 23, 1996.

BACKGROUND OF THE INVENTION

This invention relates to the use of in-ground sprinklers for watering vegetation, typically lawns or gardens. The usual means to connect in-ground sprinkler heads to a water source is through the use of a permanently buried pipe distribution system, typically consisting of PVC plastic pipes, electrically controlled valves and any necessary pipe fittings. Installation of such a system is very costly and involves extensive trenching and disturbance of the existing vegetation. Modifying or repairing the system similarly involves additional disturbance and trenching of the existing vegetation.

Existing surface connectors provide for connection at the ground surface only by use of connectors specially designed for that particular device and cannot be used with other commonly available products. In other words, the hose connecting device can only be used with the sprinkler and must be removed when the hose is to be used for other purposes. Existing surface connectors are not separated from the body of the sprinkler which means the sprinkler can shift in the ground by the force of a person connecting and disconnecting a garden hose. Existing surface connectors only allow connection of the hose in a sunken well of the sprinkler located below ground surface which makes for difficult use. It forces users to bend over further and use two hands to make the connection; one hand to push overgrown grass aside and the other to attach the hose. Existing surface connectors only provide for hose connection at a location immediately adjacent to the sprinkler head. Existing surface connections are part and parcel to their attached sprinkler head which means that users' spray options are limited to the particular spray patterns designed into that head. Existing surface connectors may not be separated from their sprinkler heads without destruction of the functionality of the head. Existing sprinkler heads with surface hose connectors may not be separated, allowing the head to be used alone as part of an underground water distribution system.

BRIEF SUMMARY OF THE INVENTION

The object of this Invention is to provide an in-ground sprinkler that can be easily attached to an ordinary garden hose at the ground surface, and thus eliminate the need for trenching and burying a permanent water distribution system. A further object of the invention is to allow easy connection and disconnection of an in-ground sprinkler from a garden hose and to provide a connector that permits an in-ground sprinkler head to be used with an above ground hose. Another object of the invention is to allow separation of the surface connector from the sprinkler head if the user desires to attach the same head to an installed underground water distribution system, thus alleviating the need to purchase all new heads. Another object of the invention is to permit the use of any sprinkler head with the desired spray pattern, or other sprinkler head features, as needed. Another object of the invention is to provide a means to connect to the bottom or side of any in-ground sprinkler head. Another object of the invention is to provide a means to connect the garden hose anywhere from immediately adjacent to the sprinkler head to any desirable distance away. Another object of the invention is to provide a swivel to raise the male hose connector away from the grass to allow easier sight and connection of the female connector on the hose, and also a means to stow the connector inconspicuously at or below ground surface when not in use so as to allow safe mowing of the grass. Another object of the invention is to provide a means to make the male hose connector stiff enough to offer sufficient resistance to push on the nose connector yet supple enough to flex and absorb excessive forces and torque which occur when individuals make their hose connections and disconnections thereby preventing the head itself from becoming dislodged from the ground and requiring a resetting of the sprinkler head's spray pattern. Another object of the invention is to provide a connecting device which is commonly available and designed for use with multiple household garden hose products.

These and other objects of the invention are accomplished by providing an in-ground sprinkler having a connector that permits attachment of an above ground hose to the in-ground sprinkler at ground level. The attachable connector comprises a semi-flexible tube connected to curved pipe fittings. In addition, a swiveling mechanism is interconnected between a pipe fitting and a quick connect device at the top of the connector, such that easy connection and disconnection of an above ground garden hose to the quick-connect device is facilitated.

The connector is connected to the sprinkler head by inserting a male pipe fitting of the connector into a female opening of the sprinkler head. This female opening of the sprinkler head is the water inlet port of the sprinkler head, and can vary in location depending on the type of in-ground sprinkler used. Typically, the water inlet port is at the bottom of the sprinkler head, but it can also be located on a side of the sprinkler head. In either configuration, the flexible tubing which connects the bottom of the assembly with the swiveling mechanism on the top allows the motion of connecting or disconnecting a garden hose and the swiveling action at the top to be absorbed by the flexible tube without disturbing the position and precise settings of the buried in-ground sprinkler head thereby eliminating the need for the sprinkler spray pattern setting to be readjusted each time the sprinkler is used. The flexible tubing is of sufficient length to permit the swiveling quick-connect mechanism at the top to be located at the ground surface near the sprinkler head or at other places convenient for the user to connect the garden hose. The length of flexible tubing also allows the connector to be connected to different sizes and shapes of sprinkler heads by allowing the device to be connected into the bottom or side of the sprinkler head and still reach the ground surface at the desired location. The top of the in-ground sprinkler is a male garden hose quick-connect device attached in a manner allowing a vertical swiveling motion to permit the quick-connect device to be stored in a position at or below ground level when the hose is not connected and the sprinkler is not in use, and to be easily raised above ground level for convenient connection to a hose when use of the sprinkler is desired. The swiveling motion is provided by a joint that allows motion while preventing water from escaping.

Among the advantages of this invention are that it may be used and adapted to cooperate with an above-ground hose. The sprinkler requires no special tools or skill for installation allowing it to be installed by an average homeowner. By installing the sprinklers incrementally, the homeowner may have an in-ground system as resources and time are available. All the advantages of an in-ground sprinkling system can be enjoyed while avoiding the great expense of in-ground plumbing. If the homeowner later desires in-ground plumbing, the connector can be easily removed from the sprinkler head allowing the head to be attached to buried pipes. Also, all of the components are easily removable for the homeowner to repair or take to a new residence or location. A sprinkler system using the sprinkler of this invention is advantageous over use of above-ground sprinklers because above-ground sprinklers must be moved and adjusted each time they are used, wasting water and time. Even when an above-ground sprinkler is not in use it must still be moved in order to mow the grass. The sprinkler of the present invention need not ever be moved nor its directional spray be readjusted once installed.

BRIEF DESCRIPTION OF THE DRAWINGS

In order that the Invention may be more readily understood, certain embodiments thereof are described below, by way of example only, in conjunction with the accompanying drawings, in which.

DETAILED DESCRIPTION OF THE INVENTION

As shown in FIGS. 1–4, the sprinkler 10 of the present invention includes an in-ground sprinkler head 20 releasably connected to a surface connector 30. Any model of commercially available in-ground sprinkler head may be used. A vinyl washer (not shown) may be placed inside the water inlet port 35 of the head 20 to aid in sealing the connection, depending on the sprinkler model design. Most sprinkler heads use a ¾ or ½ inch inlet port and the surface connector 30 of the present invention includes either size fitting as appropriate to the design of the particular sprinkler head.

Figure 5:
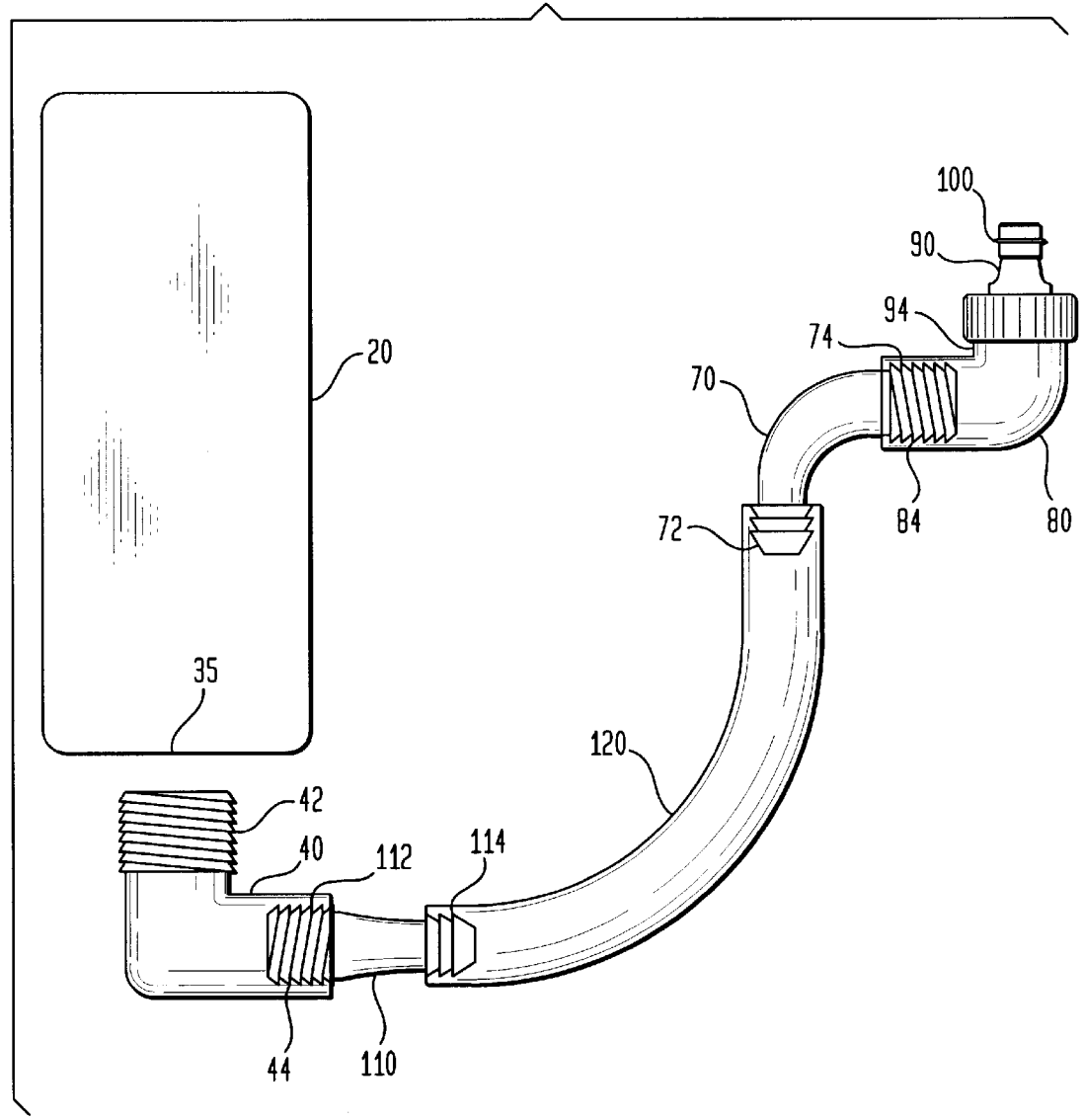
FIG. 5 is a partial, cross-sectional side view of another embodiment of the sprinkler of the present invention.

In order to allow connection at an above-ground location of an ordinary garden hose (not shown) the sprinkler head 20 is attached to a lower elbow 40. The lower elbow 40 may be threaded into a bottom inlet port 35 of a sprinkler head 20 as shown, or into a side inlet port. The lower elbow 40 is then connected to a lower barbed elbow 50. Both elbows 40, 50 are curved pipe fittings. Lower elbow 40 is a polyethylene plastic ¾ inch elbow with a male threaded fitting 42 on one end and a female fitting 44 on the other end. A vinyl washer (not shown) may be placed inside the female threaded opening 44 of the elbow 40 to aid in sealing the connection. Lower barbed elbow 50 is acetal plastic with a ¾ inch male threaded fitting 52 on one end and a barbed male fitting 54 on the other end. As shown in FIG. 5, the lower barbed elbow 50 could be replaced with a straight barbed fitting 110 depending on the configuration of sprinkler head 20 or the user's desire for a surface connection not adjacent to the sprinkler head 20. Straight barbed fitting 110 is also acetal plastic pipe with a ¾ inch male threaded fitting 112 on one end but with a straight barbed male fitting 114 on the other end. Straight barbed fitting 110 would be used with different configurations of flexible tubing 120, as depicted in FIG. 5, for a wide diameter sprinkler head, or for a surface connection at some distance from the sprinkler head 20.

Figure 1:
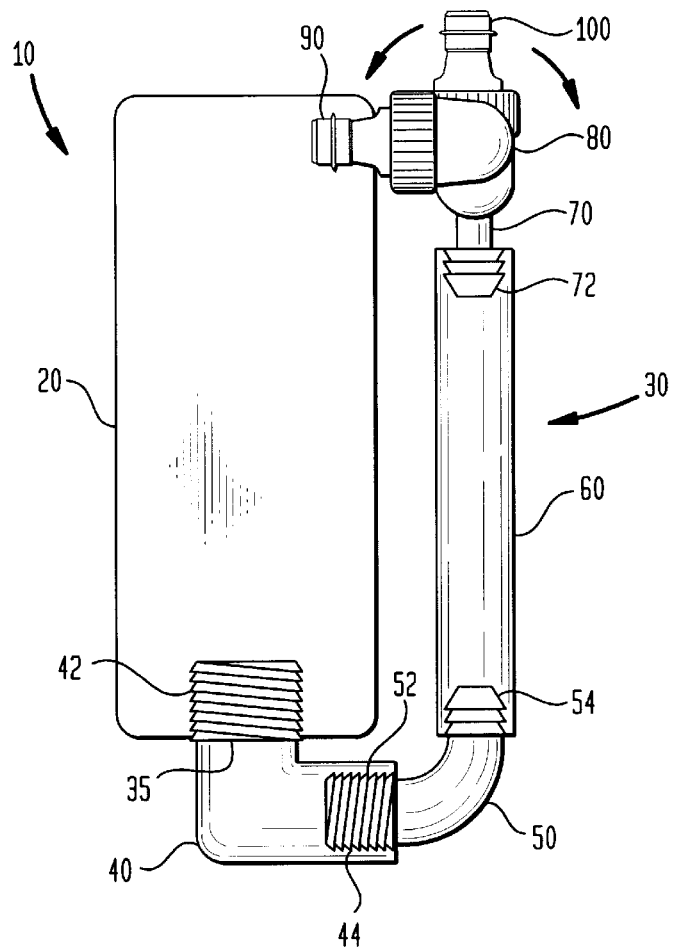
FIG. 1 is a partial, cross-sectional side view of the sprinkler according to the present invention.

Referring again to FIG. 1, the barb 54 of the lower barbed elbow 50 is inserted into one end of the semi-flexible tube 60, with a seal sufficient to allow the transmission of water under pressure without leaking. The flexible polyethylene plastic tube 60 is of various lengths, two of which are shown in FIGS. 1 and 5 respectively. The semi-flexible tube 60 extends vertically (and horizontally as shown in FIG. 5) until it is near ground level. At that point, it is attached to an upper barbed elbow 70. Upper barbed elbow 70 is also made of acetal plastic in a configuration that has a barb 72 at the end inserted into the semi-flexible tube 60 and male threads at the other end. The barb 72 allows a 360° pivoting motion around the central vertical axis inside the top of the semi-flexible tube 60 without leakage of water under pressure, providing a way for the top of the surface connector 30 to be pointed in any direction convenient to the user. The male threads 74 of upper barbed elbow 70 are mated to the female threaded opening 84 of upper elbow 80. The motion of threads 84 around threads 74 allows a 360° pivoting motion around the central horizontal axis inside the top elbow 80 without leakage of water under pressure, providing a way for the top of the surface connector 30 to be raised and lowered from the ground surface to allow convenient connection of the female connector of a garden hose not shown.

Figure 2:
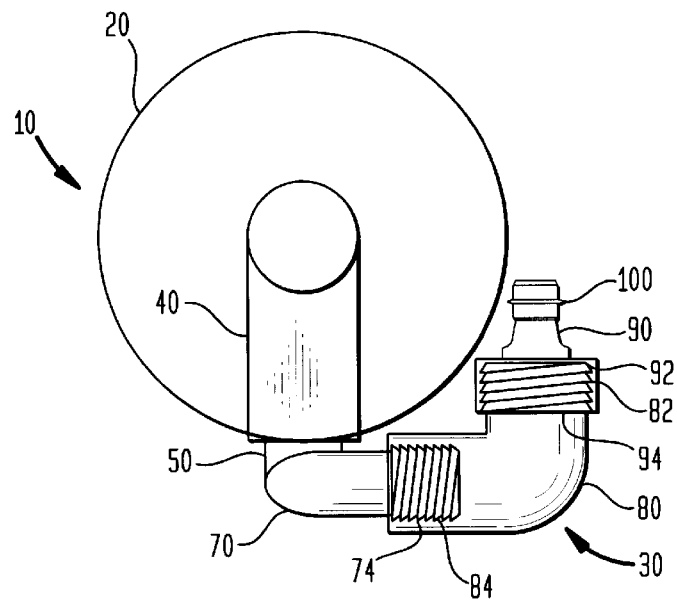
FIG. 2 is a partial, cross-sectional top view of the sprinkler of FIG. 1.
Figure 3:
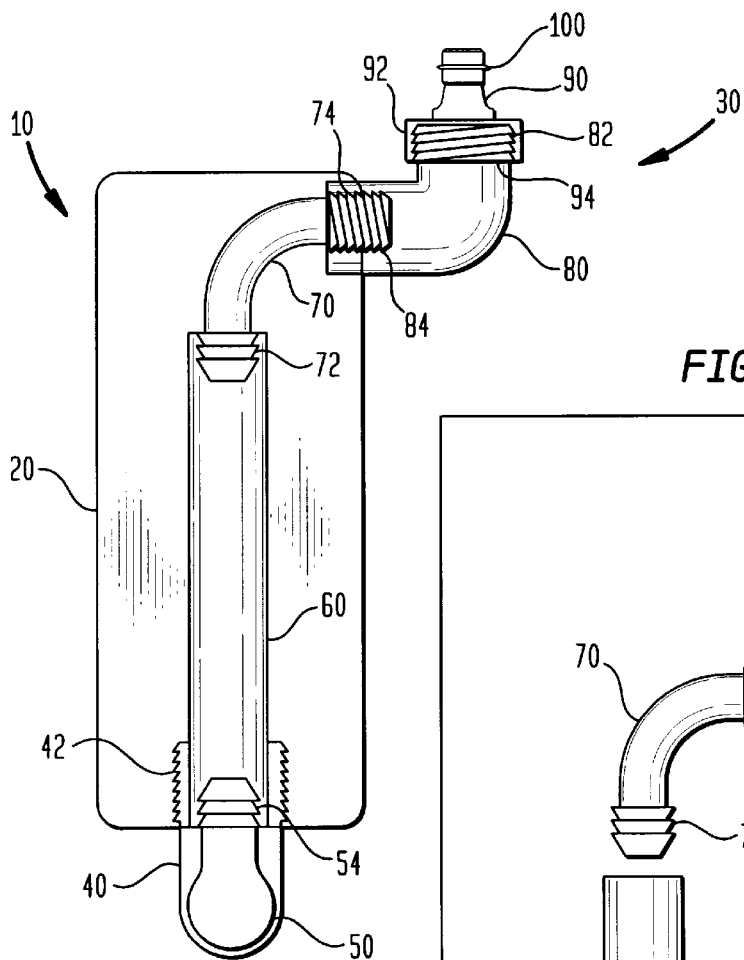
FIG. 3 is a partial, cross-sectional side view of the sprinkler of FIG. 1 oriented 90° with input to the sprinkler shown in FIG. 1.
Figure 4:
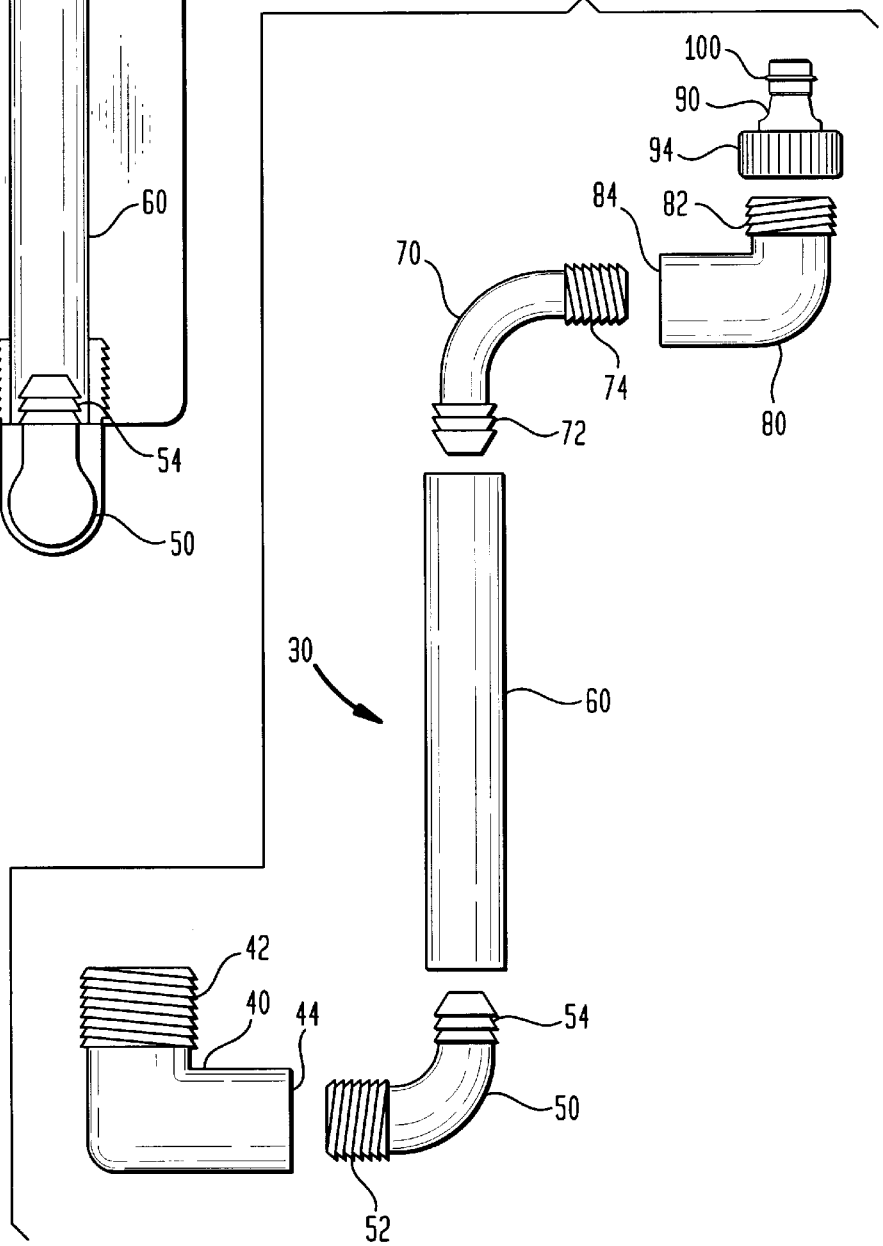
FIG. 4 is an exploded view of the surface connector of the sprinkler of FIG. 1.

The thin-lined arrows of FIG. 1 depict the range of motion of upper elbow 80 from the ground surface. Thus two swiveling configurations are depicted in these along a vertical axis and threads 84 provide a swiveling motion 360° along a horizontal axis. FIG. 5 shows upper barbed elbow 70 at 90° from its position shown in FIG. 1, and FIGS. 2 and 3 show upper barbed elbow 70 at 180° from its position shown in FIG. 1. Upper elbow 80 may include a washer or O-ring (not shown) inside the female threaded opening 84 as needed depending on the type of swiveling device used. A lubricant is sprayed inside the swiveling configurations to aid the swiveling motion. Onto the male threads 82 of upper elbow 80 are mated the female threads 92 of male quick-connect 90. Male quick-connect 90 contains a rubber washer (not shown) inside the female threaded opening 94 to aid in sealing the connection to upper elbow 80. Rubber O-ring 100 goes in a groove around the tip of male quick-connect 90 on a garden hose. The minimized opening of a male quick-connect reduces the chance that foreign material can lodge therein when a hose is not connected thereto.

What is claimed is:

1. An in-ground lawn sprinkler for underground installation and attachment to an above-ground hose, said lawn sprinkler comprising:

an in-ground sprinkler head having a water inlet opening;

a tube having a bottom end and a top end with said top end thereof being maintained substantially perpendicular to the ground's surface at a selected location relative to said sprinkler head;

a first connector connected to said water inlet opening and forming a rotating connection with said bottom end of said tube;

a second connector forming a rotating connection with said top end of said tube, said second connector including a conduit extending at the ground's surface and approximately parallel to the ground's surface; and a third connector having a first end capable of connecting to the hose, and a second end forming a coaxial and rotating connection with said conduit to define an axis shared by said conduit and said second end of said third connector, wherein said first end of said third connector can be rotated in a vertical plane about said axis and in a horizontal plane about said top end of said tube from above the ground's surface.

2. The sprinkler of claim 1, wherein said tube is made of semi-flexible material.

3. The sprinkler of claim 2, wherein said first connector forms a rotating connection with said sprinkler head.

4. The sprinkler of claim 1, wherein said conduit is in threaded engagement with said second end of said third connector.

5. The sprinkler of claim 1, further comprising a male quick-connect hose fitting connected to said first end of said third connector.

6. The sprinkler of claim 1, wherein said third connector defines a 90° elbow between said first end and said second end thereof.

7. A sprinkler adapter for using an in-ground sprinkler head with an above-ground hose, the sprinkler head having a water inlet opening, said sprinkler adapter comprising:

a tube having a bottom end and a top end with said top end thereof being maintained substantially perpendicular to the ground's surface at a selected location relative to the sprinkler head;

a first connector connected to said water inlet opening and forming a rotating connection with said bottom end of said tube;

a second connector forming a rotating connection with said top end of said tube, said second connector including a conduit extending at the ground's surface and approximately parallel to the ground's surface; and a third connector having a first end capable of connecting to the hose, and a second end forming a coaxial and rotating connection with said conduit to define an axis shared by said conduit and said second end of said third connector, wherein said first end of said third connector can be rotated in a vertical plane about said axis and in a horizontal plane about said top end of said tube from above the ground's surface.

8. The sprinkler adapter of claim 7, wherein said tube is made of semi-flexible material.

9. The sprinkler adapter of claim 8, wherein said first connector forms a rotating connection with the sprinkler head.

10. The sprinkler adapter of claim 7, wherein said conduit is in threaded engagement with said second end of said third connector.

11. The sprinkler adapter of claim 7, further comprising a male quick-connect hose fitting connected to said first end of said third connector.

12. The sprinkler of claim 7, wherein said third connector defines a 90° elbow between said first end and said second end thereof.

13. A lawn sprinkler, comprising:

an in-ground sprinkler head having a water inlet maintained beneath the ground's surface;

a defined fluid passageway having successive first, second and third portions, said first portion coupled to said water inlet and extending up to the ground's surface where an axis of said first portion is substantially perpendicular to the ground's surface, said second portion defining a 90° elbow rotatable about said axis of said first portion, said second portion further having an axis that is at and substantially parallel to the ground's surface, and said third portion defining a 90° elbow rotatable about said axis of said second portion; and a quick-connect hose fitting coupled to said third portion above the ground's surface.

14. The sprinkler of claim 13, wherein said quick-connect hose fitting is a male quick-connect hose fitting.

15. A lawn sprinkler adapter for use with an in-ground sprinkler head having a water inlet maintained beneath the ground's surface, said law sprinkler adapter comprising:

a defined fluid passageway having successive first, second and third portions, said first portion coupled to the in-ground sprinkler's water inlet and extending up to the ground's surface where an axis of said first portion is substantially perpendicular to the ground's surface, said second portion defining a 90° elbow rotatable about said axis of said first portion, said second portion further having an axis that is at and substantially parallel to the ground's surface, and said third portion defining a 90° elbow rotatable about said axis of said second portion; and a quick-connect hose fitting coupled to said third portion above the ground's surface.

16. The sprinkler adapter of claim 15, wherein said quick-connect hose fitting is a male quick-connect hose fitting.

* * * * *